United States Patent
Li et al.

(10) Patent No.: US 11,702,728 B2
(45) Date of Patent: Jul. 18, 2023

(54) POST DEPOSITION HEAT TREATMENT OF COATING ON CERAMIC OR CERAMIC MATRIX COMPOSITE SUBSTRATE

(71) Applicant: Rolls-Royce Corporation, Indianapolis, IN (US)

(72) Inventors: Li Li, Carmel, IN (US); Gregory John Kenneth Harrington, Indianapolis, IN (US); Robert Alexander Sean Golden, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/884,841

(22) Filed: May 27, 2020

(65) Prior Publication Data

US 2020/0377990 A1 Dec. 3, 2020

Related U.S. Application Data

(60) Provisional application No. 62/853,541, filed on May 28, 2019.

(51) Int. Cl.
*C23C 4/18* (2006.01)
*C23C 4/11* (2016.01)
(Continued)

(52) U.S. Cl.
CPC .............. *C23C 4/18* (2013.01); *C04B 41/009* (2013.01); *C04B 41/4539* (2013.01);
(Continued)

(58) Field of Classification Search
CPC .. C23C 4/11; C23C 4/134; C23C 4/18; C04B 41/009; C04B 41/4539; C04B 41/4543;
(Continued)

(56) References Cited

U.S. PATENT DOCUMENTS

| 4,127,416 A | 11/1978 | Lumby et al. |
| 4,315,832 A | 2/1982 | Pastor et al. |

(Continued)

FOREIGN PATENT DOCUMENTS

| EP | 1626039 A2 | 2/2006 |
| EP | 3178799 A1 | 6/2017 |

(Continued)

OTHER PUBLICATIONS

Reed Section 29.3 "Solid-State Sintering" p. 594-605, from Principles of Ceramics Processing 2nd ed (c) 1995 John Wiley & Sons, Inc (Year: 1995).*

(Continued)

*Primary Examiner* — Nathan H Empie
(74) *Attorney, Agent, or Firm* — Shumaker & Sieffert, P.A.

(57) ABSTRACT

In one example, a method for forming an environmental barrier coating (EBC) and/or abradable coating on a substrate. The method may include depositing a coating on a ceramic or ceramic matrix composite (CMC) substrate to form an as-deposited coating, wherein the coating includes at least one of an environmental barrier coating (EBC) and an abradable coating. The method further comprises heat treating the as-deposited coating at or above a first temperature for a first period of time following the deposition of the as-deposited coating on the substrate, wherein heat treating the as-deposited coating includes heating the as-deposited coating to or above the first temperature at a controlled rate. The heat treatment may be configured to at least one of decrease the open pores and/or microcracks of the heat-treated coating compared to the as-deposited coating or control a grain size of the heat-treated coating.

19 Claims, 8 Drawing Sheets

(51) Int. Cl.
| | |
|---|---|
| *C23C 4/134* | (2016.01) |
| *C04B 41/86* | (2006.01) |
| *C04B 41/45* | (2006.01) |
| *C04B 41/50* | (2006.01) |
| *C04B 41/00* | (2006.01) |

(52) U.S. Cl.
CPC ...... *C04B 41/4543* (2013.01); *C04B 41/5024* (2013.01); *C04B 41/86* (2013.01); *C23C 4/11* (2016.01); *C23C 4/134* (2016.01)

(58) Field of Classification Search
CPC ....... C04B 41/5024; C04B 41/86; B05D 3/02; B05D 3/0209
See application file for complete search history.

(56) References Cited

U.S. PATENT DOCUMENTS

| | | | |
|---|---|---|---|
| 4,474,614 | A | 10/1984 | Arentzen |
| 4,857,689 | A | 8/1989 | Lee |
| 5,362,341 | A | 11/1994 | Palmer et al. |
| 5,391,404 | A | 2/1995 | Lee et al. |
| 5,496,644 | A | 3/1996 | Lee et al. |
| 5,869,146 | A | 2/1999 | McCluskey et al. |
| 6,254,935 | B1 | 7/2001 | Eaton et al. |
| 6,284,325 | B1 | 9/2001 | Eaton, Jr. et al. |
| 6,299,988 | B1 | 10/2001 | Wang et al. |
| 6,787,195 | B2 | 9/2004 | Wang et al. |
| 6,815,012 | B2 | 11/2004 | Baumann et al. |
| 7,595,114 | B2 | 9/2009 | Meschter et al. |
| 8,356,482 | B2 | 1/2013 | Duval et al. |
| 9,347,302 | B2 | 5/2016 | Kaminksy |
| 9,527,109 | B2 | 12/2016 | Margolies et al. |
| 2004/0151840 | A1 | 8/2004 | Wang et al. |
| 2005/0013993 | A1 | 1/2005 | Li et al. |
| 2005/0238888 | A1 | 10/2005 | Spitsberg et al. |
| 2006/0110609 | A1 | 5/2006 | Eaton et al. |
| 2011/0027578 | A1* | 2/2011 | Kirby ................ C04B 41/89 428/336 |
| 2011/0033630 | A1 | 2/2011 | Naik et al. |
| 2011/0171380 | A1 | 7/2011 | Higashi et al. |
| 2013/0136915 | A1 | 5/2013 | Naik |
| 2014/0363684 | A1 | 12/2014 | Margolies et al. |
| 2016/0003063 | A1* | 1/2016 | Rosenzweig ........... C04B 41/87 60/753 |
| 2016/0280556 | A1 | 9/2016 | Park et al. |
| 2016/0305004 | A1 | 10/2016 | Olson et al. |
| 2016/0312628 | A1* | 10/2016 | Kirby ................ C04B 35/62222 |
| 2017/0176929 | A1 | 6/2017 | Van De Straete et al. |
| 2018/0347049 | A1* | 12/2018 | Oboodi .................. C04B 41/85 |
| 2018/0371600 | A1 | 12/2018 | Li et al. |
| 2019/0032504 | A1 | 1/2019 | Shi et al. |
| 2020/0148544 | A1 | 5/2020 | Sato et al. |
| 2020/0277694 | A1 | 9/2020 | Bolcavage et al. |
| 2021/0017090 | A1 | 1/2021 | Shi et al. |
| 2021/0276925 | A1* | 9/2021 | Shi ...................... C04B 41/0072 |
| 2022/0002857 | A1 | 1/2022 | Li et al. |

FOREIGN PATENT DOCUMENTS

| | | |
|---|---|---|
| EP | 3434803 A1 | 1/2019 |
| EP | 3702344 A1 | 9/2020 |
| WO | 2015126476 A2 | 8/2015 |
| WO | 2018186308 A1 | 10/2018 |

OTHER PUBLICATIONS

Zhong et al "Microstructure evolution and thermomechanical properties of plasma-sprayed Yb2SiO¬5 coating during thermal aging" J. Am. Ceram. Soc 2017; 100:1896-1906. (Year: 2017).*

Garcia et al., "Phase and Microstructure Evolution in Plasma Sprayed Yb2Si2O7 Coatings," Journal of the European Ceramic Society, vol. 39, No. 4, Apr. 2019, pp. 1477-1486.

Office Action from U.S. Appl. No. 16/804,437, dated Sep. 1, 2020, 22 pp.

Final Office Action from U.S. Appl. No. 16/804,437, dated Feb. 9, 2021, 24 pp.

Amendment in Response to Office Action dated Sep. 1, 2020, from U.S. Appl. No. 16/804,437, filed Dec. 1, 2020, 9 pp.

Lee et al., "New Generation of Plasma-Sprayed Mullite Coatings on Silicon Carbide," Journal of the American Ceramic Society, vol. 78, No. 3, Apr. 1995, pp. 705-710.

Lee et al., "Refractory Oxide Coatings in SiC Ceramics," NASA Technical Memorandum 106677, Aug. 1994, 41 pp.

Richards et al., "Response of Ytterbium Disilicate-silicon Environmental Barrier Coatings to Thermal Cycling in Water Vapor," Acta Materialia, vol. 106, Jan. 8, 2016, 14 pp.

Schneidman et al., The Fast Cooling/Heating Rate Effects in Devitrification of Glasses. II. Crystallization Kinetics, The Journal of Chemical Physics, vol. 109, No. 1, Jul. 1, 1998, pp. 186-195.

Sujidkul et al., "Correlating Electrical Resistance Change with Mechanical Damage in Woven SiC/SiC Composites: Experiment and Modeling," Journal of the American Ceramic Society, vol. 97, No. 9, Sep. 2014, pp. 2936-2942.

Uhlmann et al., "Nucleation, Crystallization and Glass Formation," Journal of Non-Crystalline Solids vol. 38 & 39, May-Jun. 1980, pp. 693-698.

Wada et al., "Mass Transfer in Polycrystalline Ytterbium Disilicate Under Oxygen Potential Gradients at High Temperatures," Acta Materialia, vol. 135, Jun. 2017, pp. 372-381.

U.S. Appl. No. 16/726,553, filed Dec. 24, 2019, by Shi et al.

U.S. Appl. No. 16/804,437, filed Feb. 28, 2020, by Bolcavage et al.

German, "Thermodynamics of Sintering," Sintering of Advanced Materials, Woodhead Publishing Series in Metals and Surface Engineering, Dec. 2010, pp. 3-32.

Office Action from U.S. Appl. No. 16/726,553, dated Nov. 10, 2021, 7 pp.

Response to Office Action dated Nov. 10, 2021, from U.S. Appl. No. 16/726,553, filed Feb. 10, 2022, 8 pp.

Bakan et al., "Yb2Si2O7 Environmental Barrier Coatings Deposited by Various Thermal Spray Techniques: A Preliminary Comparative Study", Journal of Therm Spray Tech, vol. 26, Jun. 5, 2017, pp. 1011-1024.

Office Action from U.S. Appl. No. 17/360,375, dated Apr. 6, 2022, 9 pp.

Suzuki et al., "Structure Control of Plasma Sprayed Zircon Coating by Substrate Preheating and Post Heat Treatment", Materials Transactions, vol. 46, No. 3 Mar. 2005, pp. 669-674.

Advisory Action from U.S. Appl. No. 16/726,553 dated Jul. 27, 2022, 5 pp.

Final Office Action from U.S. Appl. No. 16/726,553, dated May 16, 2022, 10 pp.

Notice of Allowance from U.S. Appl. No. 17/360,375 dated Jul. 27, 2022, 7 pp.

Response to Final Office Action dated May 16, 2022 from U.S. Appl. No. 16/726,553 filed filed Jul. 8, 2022, 9 pp.

Response to Office Action dated Apr. 6, 2022 from U.S. Appl. No. 17/360,375 filed filed Jul. 6, 2022, 9 pp.

Examiner's Answer from U.S. Appl. No. 16/726,553 dated Jan. 12, 2023, 7 pp.

Appeal Brief from U.S. Appl. No. 16/726,553, filed Oct. 17, 2022, 19 pp.

Pre-Appeal Brief Request for Review and Notice of Appeal from U.S. Appl. No. 16/726,553, filed Aug. 16, 2022, 7 pp.

Reply Brief from U.S. Appl. No. 16/726,553, filed Mar. 13, 2023, 11 pp.

* cited by examiner

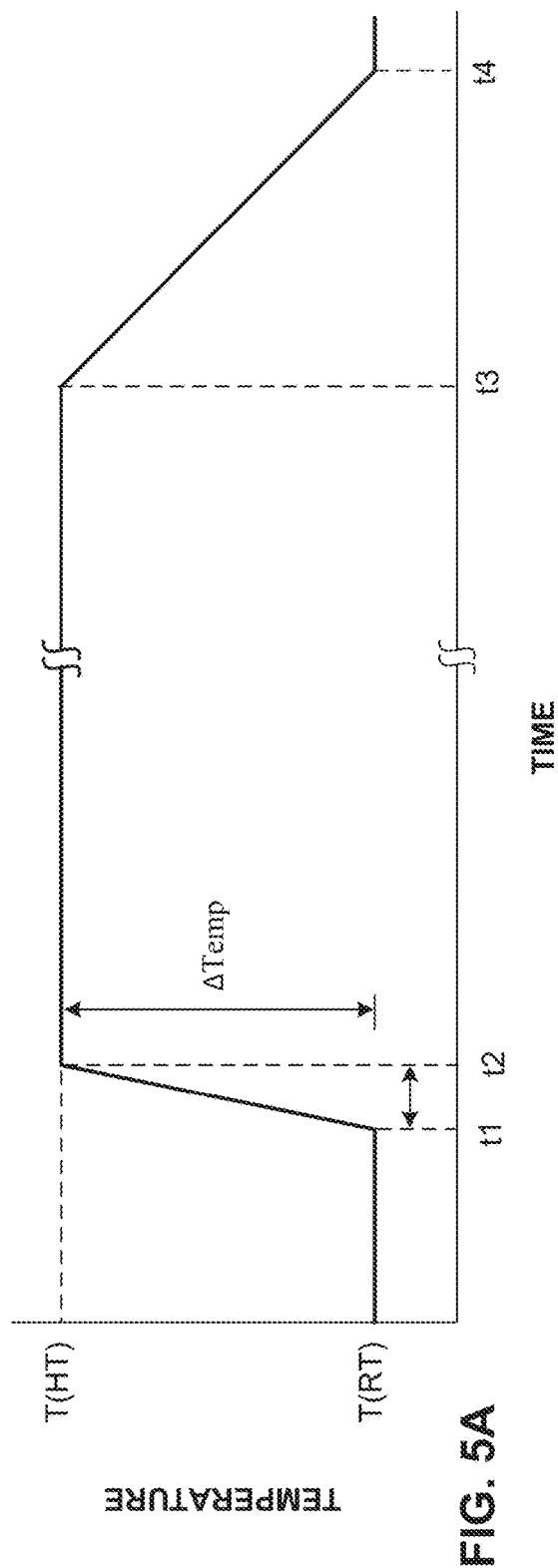
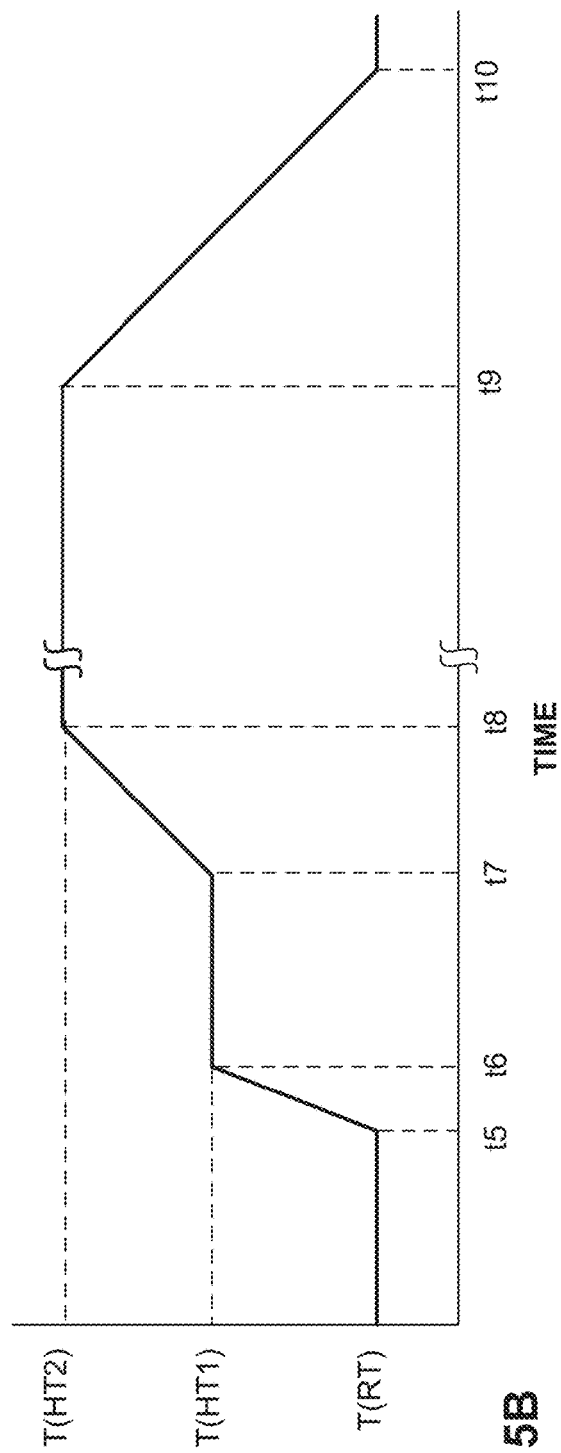
FIG. 5A
FIG. 5B

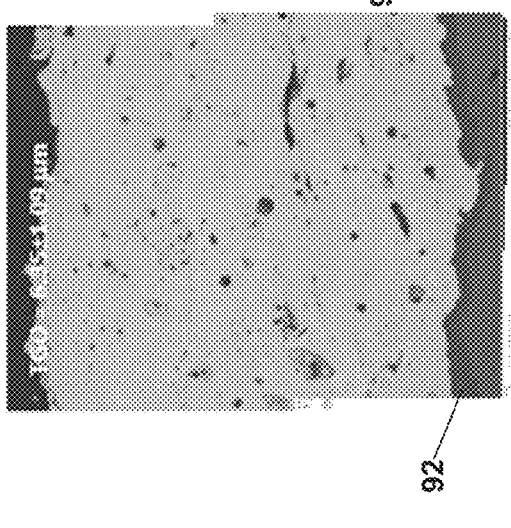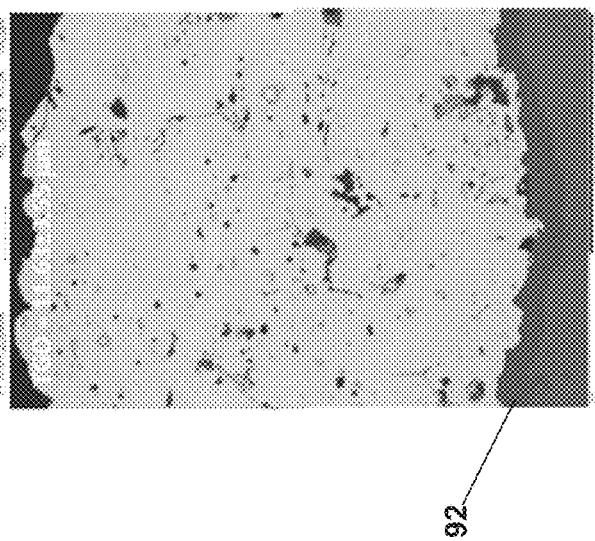
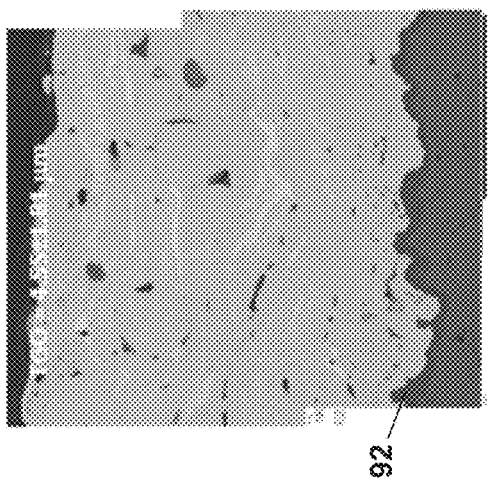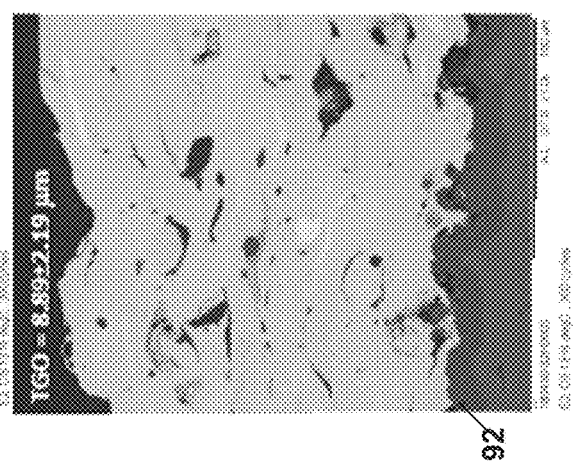
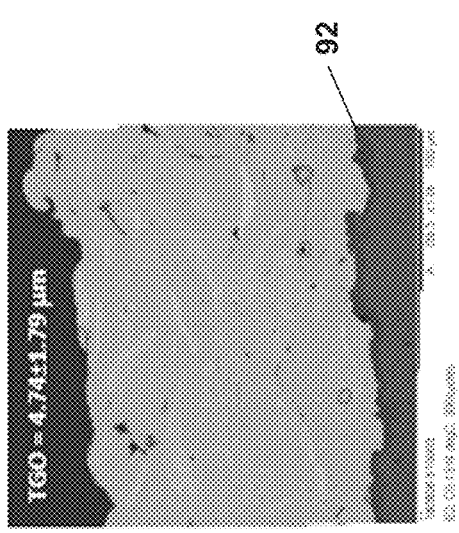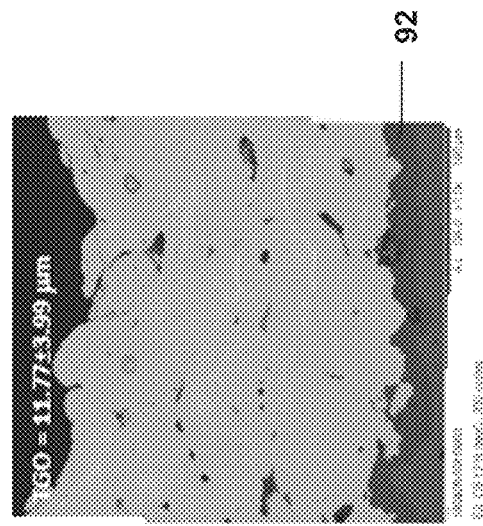
FIG. 9A  FIG. 9B  FIG. 9C

POST DEPOSITION HEAT TREATMENT OF COATING ON CERAMIC OR CERAMIC MATRIX COMPOSITE SUBSTRATE

This application claims the benefit of U.S. Provisional Patent Application No. 62/853,541, filed May 28, 2019, the entire content of which is incorporated herein by reference.

TECHNICAL FIELD

The disclosure relates to techniques for forming coatings on ceramic or ceramic matrix composite substrates.

BACKGROUND

Ceramic or ceramic matrix composite (CMC) materials may be useful in a variety of contexts where mechanical and thermal properties are important. For example, components of high temperature mechanical systems, such as gas turbine engines, may be made from ceramic or CMC materials. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and reduce mechanical properties of the ceramic or CMC material, which may reduce the useful lifetime of the component. Thus, in some examples, a ceramic or CMC material may be coated with an environmental barrier coating, which may reduce exposure of the substrate to elements and compounds present in the operating environment of high temperature mechanical systems.

SUMMARY

In some examples, the disclosure describes a method that comprises depositing a coating on a ceramic or ceramic matrix composite (CMC) substrate to form an as-deposited coating, wherein the coating includes at least one of an environmental barrier coating (EBC) and an abradable coating; and heat treating the as-deposited coating at or above a first temperature for a first period of time following the deposition of the as-deposited coating on the substrate, wherein heat treating the as-deposited coating includes heating the as-deposited coating to or above the first temperature at a controlled rate, wherein the controlled rate is selected to decrease at least one of an open porosity or microcracks of the heat-treated coating compared to the as-deposited coating.

In some examples, the disclosure describes a system comprising a deposition device configured to deposit a coating on a ceramic or ceramic matrix composite (CMC) substrate to form an as-deposited coating, wherein the coating includes at least one of an environmental barrier coating (EBC) and an abradable coating; a furnace configured to heat the as-deposited coating following deposition of the as-deposited coating by the deposition device; and a controller device configured to control the heat treatment of the as-deposited coating at or above a first temperature for a first period of time following the deposition of the as-deposited coating on the substrate, wherein the controller device controls a rate at which the furnace increases a temperature of the as-deposited coating during the heat treatment to or above the first temperature, wherein the controlled rate is selected to decrease at least one of an open porosity or microcracks of the heat-treated coating compared to the as-deposited coating.

In some examples, the disclosure describes a method comprising depositing a coating on a ceramic or ceramic matrix composite (CMC) substrate to form an as-deposited coating, wherein the coating includes at least one of an environmental barrier coating (EBC) and an abradable coating; and heat treating the as-deposited coating at or above a first temperature for a first period of time following the deposition of the as-deposited coating on the substrate, wherein heat treating the as-deposited coating includes heating the as-deposited coating to or above the first temperature at a controlled rate, wherein at least one of the controlled rate, first temperature, or first time period is selected to control a grain size of the heat-treated EBC.

In some examples, the disclosure describes a system comprising a deposition device configured to deposit a coating on a ceramic or ceramic matrix composite (CMC) substrate to form an as-deposited coating, wherein the coating includes at least one of an environmental barrier coating (EBC) and an abradable coating; a furnace configured to heat the as-deposited coating following deposition of the as-deposited coating by the deposition device; and a controller device configured to control the heat treatment of the as-deposited coating at or above a first temperature for a first period of time following the deposition of the as-deposited coating on the substrate, wherein the controller device controls a rate at which the furnace increases a temperature of the as-deposited coating during the heat treatment to or above the first temperature, wherein at least one of the controlled rate, first temperature, or first time period is selected to control a grain size of the heat-treated EBC.

The details of one or more examples are set forth in the accompanying drawings and the description below. Other features, objects, and advantages will be apparent from the description and drawings, and from the claims.

BRIEF DESCRIPTION OF DRAWINGS

FIGS. 5A and 5B are plots showing two example post deposition heat treatments on a time versus temperature basis.

FIGS. 9A-9C are images showing samples prepared to evaluate one or more aspect of the disclosure.

DETAILED DESCRIPTION

Figure 1:
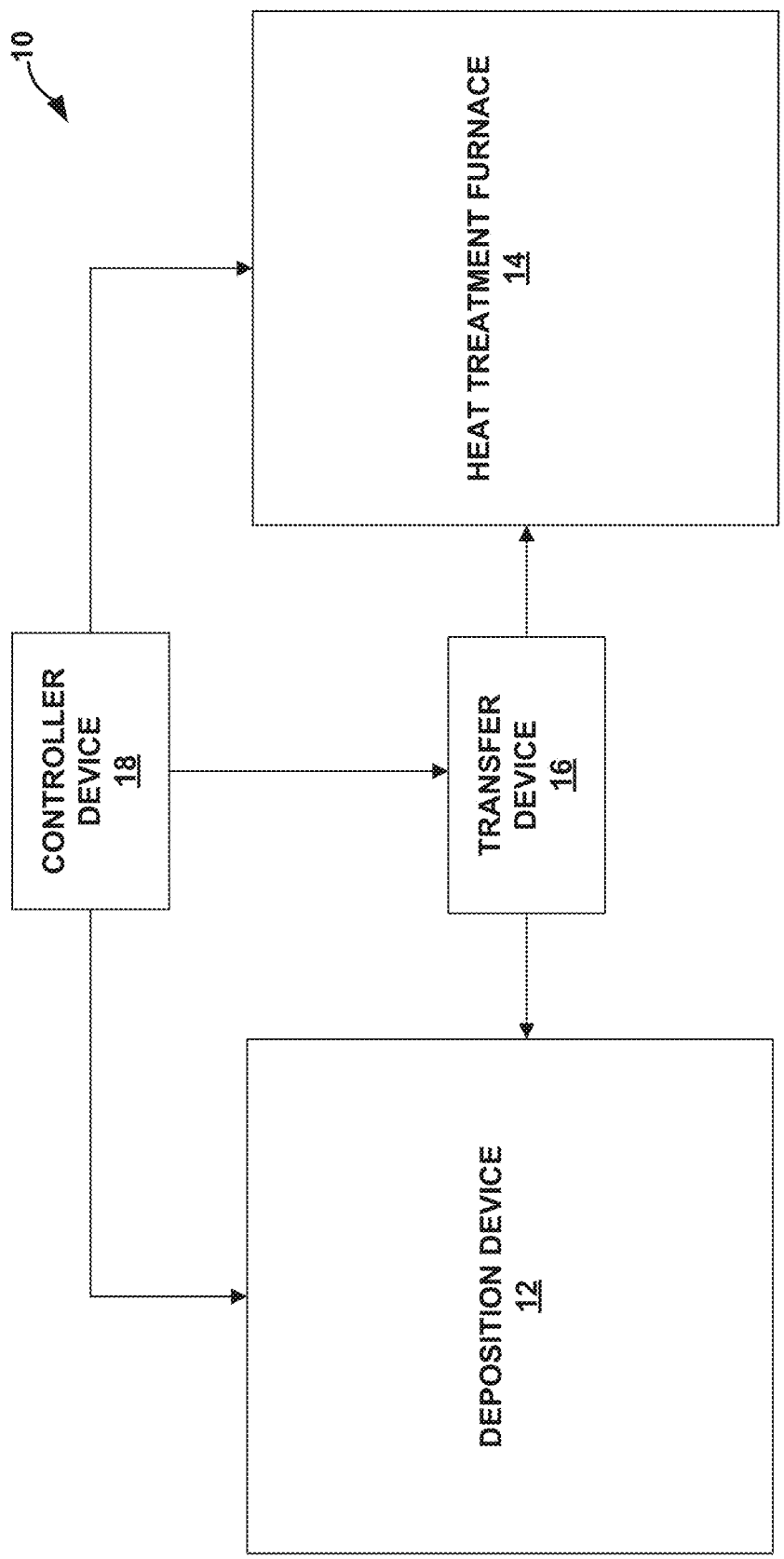
FIG. 1 is a conceptual and schematic diagram illustrating an example system for forming a coating on a substrate in accordance with an example of the disclosure.

The disclosure describes systems and techniques for forming and heating treating an abradable coating and/or environmental barrier coating (EBC) on a ceramic or CMC substrate. The coating may be deposited using, e.g., thermal spray deposition, such as air plasma spraying, slurry deposition, or other suitable technique. The coating may be deposited on the substrate that serves as components of jet engines or other high temperature systems. As described herein, following deposition, the as-deposited coating system may undergo heat treatment on the substrate to decrease the open porosity and/or microcracks of the heat treated coating as compared to the as-deposited coating porosity, control the crystalline phase grain size of the coating, and/or control the microstructure of the coating (e.g., control the size and distribution of secondary phases such as ytterbium monosilicate in the coating).

In some examples, the decrease in open porosity and/or microcracks of the heat-treated coating may include decreasing the percentage of open porosity and/or microcrack networks of the heat treated coating compared to the as-deposited coating (e.g., by filling or otherwise closing at least some of the interconnected pores and/or microcrack networks in the as-deposited coating). The decrease in the open porosity and/or microcracks of the heat-treated coating may decrease the gas permeability of the heat treated coating compared to the as-deposited coating. In some examples, the heat treatment may increase the density of the heat treated coating compared to the as-deposited coating.

EBC systems may be an important contributor to the success of CMCs in a high temperature system. For example, the EBCs may be configured to protect against oxidation, water vapor recession, and other deleterious reactions from damaging the structural CMC, e.g., during operation of the high temperature system. In some examples, an EBC may contain a multilayered structure including a silicon bond layer and a rare-earth silicate (e.g., rare earth monosilicate and/or rare earth disilicate) layer. The layers of the EBC may be deposited, e.g., using a thermal spraying process, such as, air plasma spraying, which may produce an amorphous structure within the coating, e.g., due to the high cooling rates/quenching of the particles upon impact with a substrate. The resulting amorphous structure may change to a crystalline structure over time when subjected to higher temperatures, e.g., during operation of a high temperature system. An uncontrolled transition from amorphous to crystalline structure over time may also result in volumetric changes and, thus, internal stresses in the layer(s) (e.g., a rare-earth disilicate layer). In particular, in some examples, as the EBC structure changes from amorphous to crystalline, there may be shrinkage in the overall area. This may cause a build-up in stress on the EBC as well as the silicon bond coat. Eventually, the build-up in stress reaches a threshold and causes a crack to propagate to relieve the stress state.

In some examples, an EBC may undergo a post deposition heat treatment to convert the amorphous phase of the EBC to crystalline phase. However, depending on the parameters of the heat treatment, the heat treated EBC may exhibit relatively high porosity (e.g., open porosity) and/or microcracks. The relatively high porosity and/or microcracks may reduce the ability of the coating to protect the underlying CMC substrate from oxidation and volatilization, as well as CMAS infiltration. Furthermore, the number of grains and/or the relatively small size of the grains of the crystalline phase within the heat treated EBC may result in an undesired concentration of grain boundaries within the heat treated EBC. The grain boundaries may provide pathways for penetration of water vapor through the EBC, resulting in oxidation and volatilization of the underlying CMC substrate.

As one example, a CMC plus EBC system may be comprised of a SiC/SiC CMC that is coated with a Si bond coat and a multilayered rare-earth disilicate-based EBC. In some examples, the EBC may include an abradable layer on an underlying EBC layer. For SiC/SiC CMC components that do not require an abradable coating, a non-abradable rare-earth disilicate EBC may only be applied. A thermally sprayed or otherwise deposited EBC may encompasses a certain level of open porosity and microcracks that act as open pathways for oxygen and water vapor to transport through the coating and oxidize the underlying bond coat and CMC. In addition, grain boundaries have been shown to be fast transport pathways for oxidants in rare-earth silicates. Reducing open porosity, healing microcracks and/or controlling grain size may be crucial to maximize the EBC's performance as a barrier to protect the SiC-based CMCs from oxidation and volatilization.

The as-deposited EBC may contain a significant volume percentage of amorphous material and thus devitrification (crystallization) will occur at elevated temperatures. Various densification mechanisms of the coating may apply depending upon the coatings amorphous content, chemistry and heat treatment procedure. As will be described further below, some heat treatment procedures may actually cause the coating to become more porous, e.g., as a result of a relatively low rate of temperature increase to the heat treatment temperature.

In accordance with examples of the disclosure, systems and techniques are described that include heat treating the coating following deposition on a ceramic or CMC substrate. The deposited coating may include one or more EBC layers and/or abradable layers. As will be described, the heat treatment of the as-deposited coating may be configured to at least one of decrease the porosity (e.g., open porosity and/or microcracks) of the heat treated coating as compared to the as-deposited coating, control, e.g., increase, the grain size of the crystalline phase of the heat treated coating, and/or control the microstructure and distribution of the heat treated coating (e.g., control the size and distribution of secondary phases such as ytterbium monosilicate in the coating).

In some examples, the heat treatment may include heating the as-deposited coating at a relatively high rate to the elevated heat treatment temperature (e.g., from room temperature). For example, the heat treatment may include raising the temperature of the as-deposited coating at a rate of greater than 15 degrees Celsius (° C./min), such as about 100° C./min to about 300° C./min to the elevated heat treatment temperature. In some examples, the elevated heat treatment temperature may be set at about 500° C. to about 1500° C. The coating may be maintained at the elevated heat treatment temperature for a selected period of time.

As will be described below, in some examples, the relatively high rate of temperature change to the elevated heat treatment temperature may allow the amorphous phase of the as-deposited coating to flow, e.g., to fill the pores and/or microcracks of the coating, before transitioning to crystalline phase. In some examples, the flow of the amorphous material may close at least some of the interconnected pores of the open porosity and/or close at least some of the microcrack networks present in the as-deposited coating. In this manner, the porosity and/or microcracks of the coating may be decreased, which may increase the hermeticity of the coating for protection of the underlying substrate from water vapor and oxygen. In some examples, the density of the heat treated coating may be increased compared to the as-deposited coating.

Conversely, it has been found that is some cases, increasing the temperature at a relatively low rate (e.g., less than 15° C./min) may cause the amorphous phase to transition to crystalline phase with substantially no flow such that the microstructure of the coating is effectively "locked in" without the amorphous material flowing into the pores and microcrack of the as-deposited material. In such an example, the porosity (e.g., open porosity and/or microcracks) of the as-deposited layer may not substantially decrease as a result of the heat treatment.

Although not wishing to be bound by theory, two possible mechanisms caused by the relatively high heating rate during heat treatment include: 1) the heating rate is fast enough that the amorphous component of the as-deposited coating may become viscoelastic and has sufficient time to flow before the onset of crystallization, thereby closing open porosity and/or healing (e.g., filling) cracks in the coating; and/or 2) the fast heating rate delays the onset of crystallization thereby allowing the coating sufficient time to become viscoelastic and flow. Such delayed onset of crystallization with be consistent with changing the crystallization kinetics of a glass by increasing the heating rate. In some examples, the two mechanisms may be densification mechanisms.

In some examples, the heat treatment may include heating the as-deposited coating to an elevated heat treatment temperature and maintaining the coating at (or above) that heat treatment temperature for a set period of time. In addition to, or as an alternative to decreasing the porosity and/or microcracks of the coating, the parameters of the heat treatment (e.g., the heat treatment temperature, the rate of temperature increase to reach the heat treatment temperature, and/or the duration of period of time) may be selected to control the grain size of the crystalline phase of the resulting heat treated coating. For example, in some instances, the heat treatment temperature, rate of temperature increase, and/or duration may be selected to nucleate a relatively low number of grains during crystallization of the amorphous as-deposited coating, and then growing those grains during the heat treatment. Compared to a heat treatment that nucleates more grains, resulting heat treated coating may have a lower amount of grain boundaries within the heat treated layers, thereby decreasing the transport pathways for oxidants within the heat treated coating.

In some examples, the disclosure relates to techniques for densifying or otherwise modifying a plasma sprayed EBC so that the coating will have reduced porosity and microcracks. An EBC will have a lower gas permeability which will enhance the coatings performance as a barrier to protect SiC-based CMC from oxidation and volatilization. The SiC-based CMC component coated with an abradable coating and/or EBC and a bond coat that are deposited by a plasma spray or slurry based processing techniques. The abradable coating and EBC may be comprised of a rare-earth (RE) monosilicate, RE disilicate or a mixture thereof, and the bond coat may be comprised of silicon, a metal silicide, RE monosilicate, RE disilicate, hafnium silicate, mullite, SiC, a metal oxide or a mixture thereof.

Examples of the disclosure may include a post coating heat treatment in air, oxygen, water vapor, inert gas, vacuum or combinations thereof. The heat treatment may be implemented at a fast heating rate, e.g. greater than 15° C./min, such as, about 100° C./min to about 300° C./min. The heat treatment temperature can be set at, e.g., about 500° C. to about 1500° C., with a total time duration of about 0.1 to about 100 hours. In some examples, a single heat treatment may be comprised of several segments where one segment is aimed to densify or decreasing the porosity and/or microcracks of the coating while another segment is aimed to control the grain size of the coating. Each segment may have a unique temperature and time.

FIG. 1 is a conceptual and schematic diagram illustrating an example system 10 for depositing a coating on a substrate and subsequently heat treating the as-deposited coating. The heat treatment may be configured to decrease the porosity of the as-deposited coating, control the grain sizes of the heat treated coating, and/or control the microstructure and distribution of the heat treated coating (e.g., control the size and distribution of secondary phases such as ytterbium monosilicate in the coating). As shown, system 10 includes deposition device 12, heat treatment furnace 14, and transfer device 16.

Figure 2:
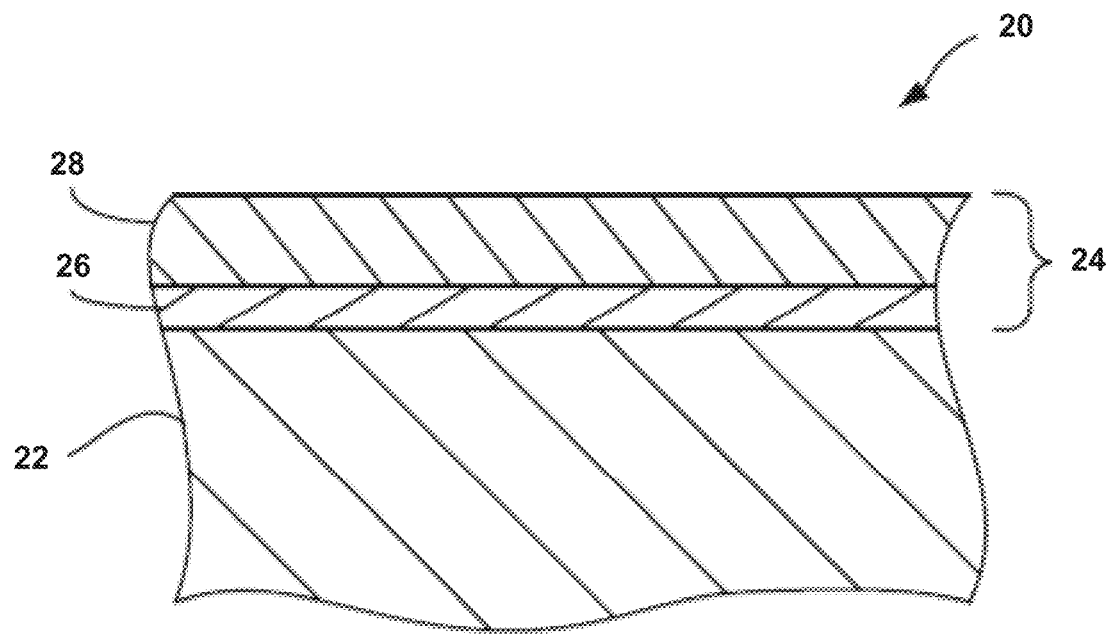
FIG. 2 is a conceptual block diagram illustrating an example article including an EBC layer and a bond layer on a substrate.
Figure 3:
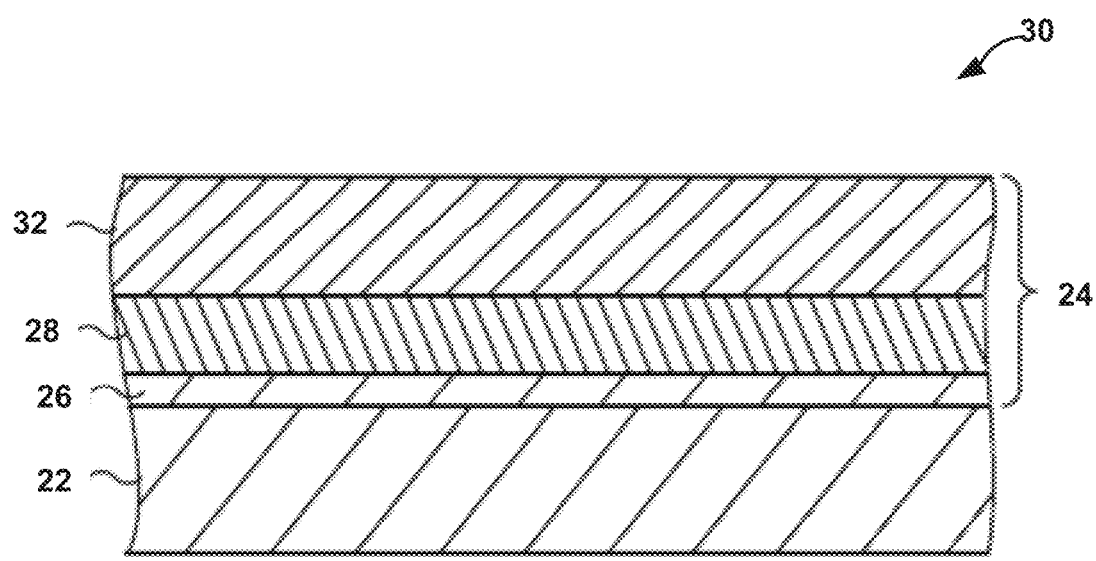
FIG. 3 is a conceptual block diagram illustrating an example article including an abradable layer, an EBC layer and a bond layer on a substrate.

Deposition device 12 may be configured to deposit one or more layers of a coating system on a substrate to form a coated article, such as article 20 in FIG. 2 or article 30 in FIG. 3, which include coating 24 on substrate 22. In some examples, deposition device 12 may be configured to deposited coating 24 using a thermal spray process, a slurry deposition process, and/or other process suitable for depositing a coating, such as, an EBC and/or abradable coating. Example thermal spray processes may include suspension plasma spray, low pressure plasma spraying, plasma spray physical vapor deposition, and air plasma spraying. In one example, deposition device 12 may be configured to deposit the one or more layers of a coating system using a plasma spray process, such as an air plasma spray process. Coating 24 may be deposited via deposition device 12 in an atmosphere including, for example, air, an inert atmosphere, a vacuum, or the like. In some examples, the deposition of coating 24 by deposition device 12 may take place in a heated environment or may take place at room temperature. For ease of description, the operation of system 10 will primarily be described herein with regard to article 20 of FIG. 2 although other articles formed using system 10 are contemplated including article 30 of FIG. 3.

Furnace 14 may be configured to heat and maintain article 20 at a relatively high temperature following the deposition of layer(s) of a coating system using deposition device 12, e.g., to perform a post-deposition heat treatment on the coated substrate. Furnace 14 may include an internal cavity sized and otherwise configured to contain article 20 after the deposition of coating 24 on substrate 22. Any suitable type of furnace 14 may be used that is capable of functioning as described in this disclosure. Furnace 14 may be an air furnace or a box furnace. In one example, a box furnace may be used with a controllable heat source. In some examples, furnace 14 may include one or more suitable heat sources such as moly-disilicide and/or silicon carbide heating elements, although other types of heat sources are contemplated. In one example, a conveyor-belt furnace may be employed. In one examples, an induction system may be used to directly heat article 20 to deliver high heating rates. In some examples, article 20 may be heated for heat treatment using an oxy-fuel burner rather than a furnace.

Transfer device 16 may be configured to robotically transfer article 20 between furnace 14 and thermal spray device 12, as desired before and/or after the deposition of coating 24 via deposition device 12. In other examples, article 20 may be manually transferred from deposition device 12 to furnace 14 following the deposition of coating 24.

Controller device 18 may be configured as a control device that controls deposition device 12, furnace 14, and/or transfer device 16 to operate in the manner described herein.

For example, controller device 18 may be configured to control the temperature, including heating rate and temperature of furnace 14, e.g., during the post-deposition heat treatment of article 20. Controller device 18 may be configured to control transfer device 16 to control the transfer of article 20 from deposition device 12 to furnace 14. Controller device 18 may be communicatively coupled to at least one of deposition device 12, furnace 14, and/or transfer device 16 using respective communication connections. Such connections may be wireless and/or wired connections. While controller device 18 is shown as a single device, in other examples, controller device 18 may be more than one controller device, such as, e.g., where each of furnace 14, deposition device 12 and transfer device 16 are controlled by different controller devices.

Controller device 18 may include, for example, a desktop computer, a laptop computer, a workstation, a server, a mainframe, a cloud computing system, or the like. Controller device 18 may include or may be one or more processors or processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing circuitry" as used herein may refer to any of the foregoing structure or any other structure suitable for implementation of the techniques described herein. In addition, in some examples, the functionality of controller device 18 may be provided within dedicated hardware and/or software modules.

In one example, system 10 may be configured to form an article such as article 20 shown in FIG. 2, which includes coating 24 deposited on substrate 22. For example, system 10 may be configured to deposit one or more layers of coating 24 on substrate 24 using deposition device 12, e.g., by slurry deposition, air plasma spraying or other thermal spray deposition process. Following the deposition of coating 24 on substrate 22 by deposition device 12, article 20 may be moved to furnace 14 (e.g., via transfer device 16) for a post deposition heat treatment. As will be described further below, the post-deposition heat treatment in furnace 14 may be controlled by controller device 18 so that article 66 is at an elevated temperature (e.g., a temperature at or above the crystallization temperature of one or more layers of coating 24) for a desired duration of time. Controller device 18 may control the specific rate that the temperature is increased to reach the elevated heat treatment temperature. In some examples, the post-deposition heat treatment in furnace 14 may provide for a decrease in the open porosity and/or microcracks of one or more layers of coating 24, e.g., based on the rate of temperature increase, and/or control of the grain sizes within one or more layers of the heat treated coating 24.

FIG. 2 is a conceptual diagram illustrating an example article 20 including a substrate 22 and coating 24. Coating 24 includes an optional bond coat 26 and EBC layer 28. In some examples, article 20 may include a component of a gas turbine engine. For example, article 20 may include a part that forms a portion of a flow path structure, a seal segment, a blade track, an airfoil, a blade, a vane, a combustion chamber liner, or another portion of a gas turbine engine. Although not shown in FIG. 2, EBC layer 28 may include plurality of voids (e.g., pores, intercolumnar voids, cracks, and/or the like) within the layer. As described herein, heat treatment of coating 24 may decrease the porosity of the as-deposited EBC layer 28, e.g., by rapidly increasing the temperature of coating 24 during post-deposition heat treatment to at least partially fill or close at least some of the voids during the heat treatment.

Substrate 22 may include a material suitable for use in a high-temperature environment. In some examples, substrate 22 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 22 includes a ceramic, the ceramic may be substantially homogeneous.

In examples in which substrate 22 includes a CMC, substrate 22 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

Substrate 22 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

Coating 24 may help protect underlying substrate 22 from chemical species present in the environment in which article 20 is used, such as, e.g., water vapor, calcia-magnesia-alumina-silicate (CMAS; a contaminant that may be present in intake gases of gas turbine engines), or the like. Additionally, in some examples, coating 24 may also protect substrate 22 and provide for other functions besides that of an EBC, e.g., by functioning as a thermal barrier coating (TBC), abradable coating, erosion resistant coating, and/or the like.

As illustrated in FIG. 2, optional bond coat 26 of coating 24 is on substrate 22. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 2, bond coat 26 of coating system 24 may be directly on substrate 22. In other examples, one or more coatings or layers of coatings may be between bond coat 26 of coating 24 and substrate 22.

Bond coat 26 may be between EBC layer 28 and substrate 22 and may increase the adhesion of EBC layer 28 to substrate 22. In some examples, bond coat 26 may include silicon and take the form of a silicon bond layer. In some examples, bond coat 16 may include silicon, a metal silicide, RE monosilicate, RE disilicate, hafnium silicate, mullite, SiC, a metal oxide or a mixture thereof. Bond coat 16 may be in direct contact with substrate 22 and EBC layer 28. In some examples, bond coat 26 has a thickness of approximately 25 microns to approximately 250 microns, although other thicknesses are contemplated.

In examples in which substrate 22 includes a ceramic or CMC, bond coat 26 may include a ceramic or another material that is compatible with the material from which substrate 22 is formed. For example, bond coat 26 may include mullite (aluminum silicate, $Al_6Si_2O_{13}$), silicon metal or alloy, silica, a silicide, or the like. Bond coat 26 may further include other elements, such as a rare earth silicate including a silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 26 may be selected based on the chemical composition and/or phase constitution of substrate 22 and the overlying layer (e.g., EBC layer 28 of FIG. 2). For example, if substrate 22 includes a ceramic or a CMC, bond coat 26 may include silicon metal or alloy or a ceramic, such as, for example, mullite.

In some cases, bond coat 26 may include multiple layers. For example, in some examples in which substrate 22 includes a CMC including silicon carbide, bond coat 26 may include a layer of silicon on substrate 22 and a layer of mullite, a rare earth silicate, or a mullite/rare earth silicate dual layer on the layer of silicon. In some examples, a bond coat 26 including multiple layers may provide multiple functions of bond coat 26, such as, for example, adhesion of substrate 22 to an overlying layer (e.g., EBC layer 28 of FIG. 2), chemical compatibility of bond coat 26 with each of substrate 22 and the overlying layer, a better coefficient of thermal expansion match of adjacent layers, or the like.

Bond coat 26 may be applied on substrate 22 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

Coating 14 includes EBC layer 28, which may be configured to help protect substrate 22 against deleterious environmental species, such as CMAS and/or water vapor. EBC layer 28 may include at least one of a rare-earth oxide, a rare-earth silicate, an aluminosilicate, or an alkaline earth aluminosilicate. For example, EBC 28 may include mullite, barium strontium aluminosilicate (BSAS), barium aluminosilicate (BAS), or strontium aluminosilicate (SAS). In some examples, EBC 28 may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

EBC layer 28 may be any suitable thickness. For example, EBC layer 28 may be about 0.005 inches (about 127 micrometers) to about 0.100 inches (about 2540 micrometers). In examples in which layer 28 is a non-abradable layer, layer 28 may have a thickness of about 0.001 inches (about 25.4 micrometers) to about 0.005 inches (about 127 micrometers). In other examples, layer 28 may have a different thickness.

FIG. 3 is a conceptual diagram illustrating another example article 30 including a substrate 22 and coating 24. Coating 24 and substrate 22 may be the same or substantially similar to that of coating 24 and substrate 22 of FIG. 3 and are similarly numbered. However, unlike that of article 20 shown in FIG. 2, coating system 24 includes abradable layer 32 on EBC layer 28. In such a configuration, coating 24 may be configured such that abradable layer 32 has a greater porosity than EBC layer 28, and the porosity of abradable layer 32 may be provided such that the outer surface of abradable layer 32 is abraded, e.g., when brought into contact with an opposing surface such as a blade tip. Abradable layer 32 may be on EBC layer 28, which may provide for better adhesion of abradable layer 32 to optional bond layer 26 or substrate 22. In some examples, abradable layer 32 may be about 0.005 inches (about 127 micrometers) to about 0.100 inches (about 2540 micrometers) thick. In other examples, layer 32 may have a different thickness. Although abradable layer 32 is shown as being formed on EBC layer 28, in other examples, coating 24 of article 30 may not include EBC layer 28.

The composition of abradable layer 32 may be the same or substantially similar to that of the composition described above for EBC layer 28. Regardless of the composition or the thickness of EBC layer 28 or abradable layer 32 of FIGS. 2 and 3, EBC layer 28 and abradable layer 32 may include a plurality of voids. For example, EBC layer 28 and abradable layer 32 may have a porous microstructure or a columnar microstructure. A porous microstructure may include a plurality of pores (e.g., voids) within the layer material, and a columnar microstructure may include columns of the layer material extending from the surface of a substrate (or another coating layer) with elongated intercolumnar voids. A porous or a columnar microstructure may improve the in-plane strain tolerance and/or the thermal cycle resistance of layers 28 and 32. In some examples, an average minimum dimension of the voids, such as, for example, an average minimum diameter of a pore of a porous microstructure, may be about 0.1 micrometers (μm) to about 20 μm.

In some example, layer 28 or layer 32 may include a porosity of more than about 10 vol. %, such as more than about 20 vol. %, more than 30 vol. %, or more than about 40 vol. %, where porosity is measured as a percentage of pore volume divided by total volume of the respective layer. When configured as a non-abradable layer, EBC layer 28 may include a porosity of more than about 1 vol. %, such as more than about 2 vol. %, more than 3 vol. %, or about 5 vol. % to about 10 vol. %, where porosity is measured as a percentage of pore volume divided by total volume of EBC layer 28. In some examples, EBC 28 may include a porosity of less than about 10%, such as about 1% to about 5%, where porosity is measured as a percentage of pore volume divided by total volume of EBC 28. The porosity of EBC 28 may be the porosity following the EBC heat treatment described herein. When configured as an abradable layer, abradable layer 32 may include a porosity of more than about 15 vol. %, such as more than about 25 vol. %, more than 35 vol. %, or about 25 vol. % to about 45 vol. %, where porosity is measured as a percentage of pore volume divided by total volume of layer 32. In some examples, abradable layer 32 may include a porosity of more than about 5%, such as about 7% to about 20% where porosity is measured as a percentage of pore volume divided by total volume of layer 32. The porosity of abradable layer 32 may be the porosity following the abradable coating heat treatment described herein. The porosity of abradable layer 32 may be greater than the porosity of EBC layer 28. In each case, the porosity of layers 28 and 32 may be measured using mercury porosimetry, optical microscopy or Archimedean method.

As described herein, in some examples, a post-deposition heat treatment may be used to decrease the porosity and/or microcracks of one or more layers of coating 24. For examples, one or more layers of coating 24 may include open pores (e.g., interconnected pores in the layer) and/or microcrack networks. The open pores and/or microcracks may results in coating 24 being permeable to gas, which may allow for undesirable oxidation and volatilization of article 20. The post deposition heat treatment of coating 24, e.g., using a temperature increase of greater than 15° C./min, may decrease the open porosity and/or microcracks in one or more layers of coating 24, e.g., as compared to the as-deposited coating and/or a similar coating heat treated using a temperature increase of 15° C./min or less. The percentage of open porosity and/or microcracks in the one or more layers of coating 24 may be decreased to lower the gas permeability of coating 24, e.g., which will enhance the coatings performance as a barrier to protect substrate 22 from oxidation and volatilization.

The porosity and/or microcracks of layer 28 and/or layer 32 as deposited may be decreased by heat treatment of coating 24 following deposition. In some examples, the heat treatment of coating 24 may decrease the porosity and/or microcracks of EBC layer 28 by at least about 25 percent, at least about 33% (e.g., from about 6% to about 4%), or at least about 50 percent (e.g., from about 6% to about 3%), e.g., as compared to the porosity of the as-deposited EBC layer 28 and/or a similar coating that underwent heat treatment with a slower rate of temperature increase (e.g., 15° C./min or less). In some examples, the heat treatment of coating 24 may decrease the porosity and/or microcracks of abradable layer 32 by at least 10 percent, such as about 10% to about 30%, compared to the porosity of the as-deposited abradable layer 32.

In some examples, the porosity of layers 28 and 32 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within coating 24.

In other examples, the porosity of layers 28 and 32 may be controlled by the use of coating material additives and/or processing techniques to create the desired porosity. For example, to form an abradable layer such as layer 32 of coating 24 in FIG. 3, a fugitive material that melts or burns at the use temperatures of the component (e.g., a blade track) may be incorporated into the coating material that forms layer 32. The fugitive material may include, for example, graphite, hexagonal boron nitride, or a polymer such as a polyester, and may be incorporated into the coating material prior to deposition of the coating material on substrate 22 to form layer 32. The fugitive material then may be melted or burned off in a post-formation heat treatment, or during operation of the gas turbine engine, to form pores in coating 24. The post-deposition heat-treatment may be performed at up to about 1500° C. for a component having a substrate 22 that includes a CMC or other ceramic.

In other examples, the porosity of coating 14 may be created or controlled in a different manner, and/or coating 14 may be deposited on substrate 22 using a different technique. For example, coating 14 may be deposited using a wide variety of coating techniques, including, for example, a thermal spraying technique such as plasma spraying or suspension plasma spraying, physical vapor deposition (PVD) such as EB-PVD (electron beam physical vapor deposition) or DVD (directed vapor deposition), cathodic arc deposition, slurry process deposition, sol-gel process deposition, or combinations thereof.

In some examples in which EBC layer 28 or abradable layer 32 has a columnar microstructure, layer 28 or layer 32 may be deposited on substrate 32 using a suspension plasma spray technique, an EB-PVD technique, a plasma spray physical vapor deposition (PSPVD) technique, or a directed vapor deposition (DVD) technique. In some examples, layer 28 or layer 32 including a columnar microstructure may include a dense vertically cracked (DVC) coating, which in some cases, may be deposited on substrate 22 using an air plasma spray technique.

Figure 4:
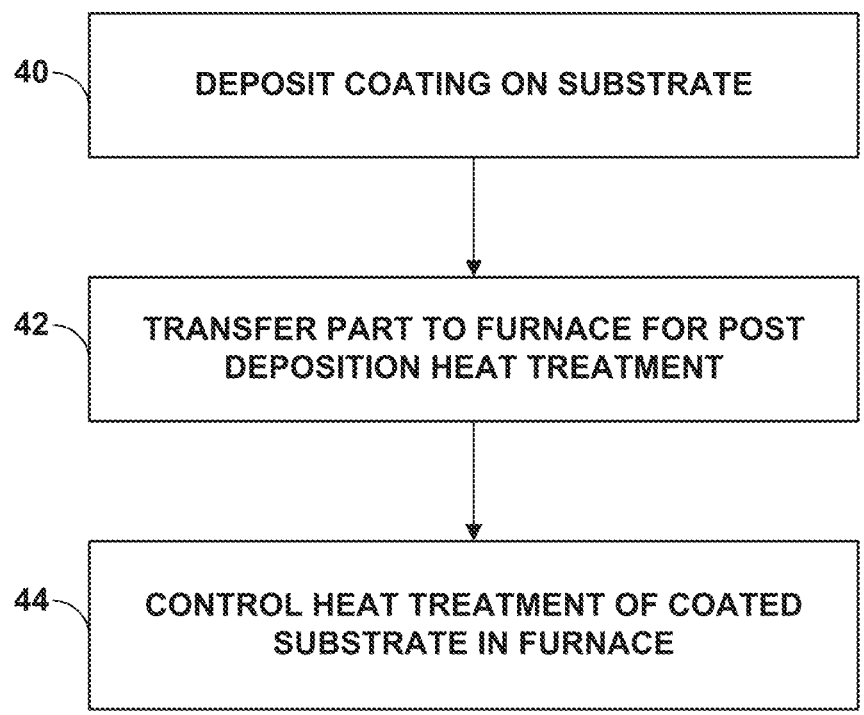
FIG. 4 is a flow diagram illustrating an example technique for forming an article in accordance with an example of the disclosure.

FIG. 4 is a flow diagram illustrating an example technique for forming a coating that on a substrate followed by a post deposition heat treatment, e.g., to decrease the porosity and/or microcrack networks of one or more layers of the coating, control the grain size within one or more layers of the coating, and/or control the microstructure of the coating (e.g., control the size and distribution of secondary phases such as ytterbium monosilicate in the coating). The technique of FIG. 4 will be described with respect to system 10 of FIG. 1 and article 20 of FIG. 2 for ease of description only. A person having ordinary skill in the art will recognize and appreciate that the technique of FIG. 4 may be implemented using systems other than system 10 of FIG. 1, may be used to form articles other than article 20 of FIG. 2, or both. In some examples, the technique of FIG. 4 may be used to form article 30 of FIG. 3.

As shown in FIG. 4, substrate 22 may be positioned within deposition device 12 and controller device 18 may control deposition device 12 to deposit one or more layers of coating 24 on substrate 22 (40). For example, deposition device 12 may deposit bond layer 26 and EBC layer 28 by thermal spraying (e.g., air plasma spraying) or slurry deposition under the control of controller device 18 (40). In some examples, a tape casting process may be used to deposit one or more of layers 26 and 28. The temperature within deposition device 12 may be approximately room temperature or elevated above room temperature.

When coating 24 is deposited, EBC layer 28 and/or bond layer 26 may have a relatively high amorphous phase concentration, e.g., due to the high cooling rates/quenching of the particles upon impact with substrate 24. For example, the layer(s) of EBC system 68 may have an amorphous phase of at least about 70%, such as, at least about 85 wt %. Conversely, the layer(s) of EBC system 68 may have a crystalline phase of less than about 30%, such as less than about 15 wt %. As noted above, without a post-deposition heat treatment, the amorphous phase may change to a crystalline structure over time when subjected to higher temperatures, e.g., during operation of a jet engine. An uncontrolled transition from amorphous to crystalline structure with time may also result in volumetric changes and, thus, internal stresses in the layer(s).

Following deposition of coating 24 on substrate 22, article 20 may be transferred to furnace 14 by transfer device 16 for a post-deposition heat treatment (42). Once article 20 is within furnace 14, controller device 18 may control the temperature of furnace to heat treat article 20 by heating coating 24 to or above a selected temperature for a selected period of time (44). In some examples, the post-deposition heat treatment may take place before or after article 20 cools to room temperature following deposition. The post-deposition heat treatment temperature and duration within furnace 14 may be controlled by controller device 18 and may be selected to increase the crystalline phase concentration of EBC system 68 on substrate 24. For example, furnace 14 may be at a treatment temperature of at or above the crystalline temperature of the layer(s) of EBC system 68.

In accordance with some examples of the disclosure, the post-deposition heat treatment of coating 24 may be configured to decrease the porosity and/or microcrack networks of EBC layer 28 and/or bond layer 26. In some examples, the heat treatment may include increasing the temperature of coating 24 at a relatively fast rate (e.g., a rate greater than 15° C./min, such as, about 100° C./min to about 300° C./min). In some examples, coating 24 may be at approximately room temperature (e.g., about 23° C.) at the beginning of the heat treatment. The temperature of coating 24 may be increased (e.g., by heating in furnace 14) at the relatively high rate to the desired elevated heat treatment temperature. In some examples, the heat treatment temperature may be at or above about 500° C. to about 1500° C. Coating 24 may be held at or above the heat treatment temperature for a desired period of time (e.g., about 0.1 hours to about 100 hours). Controller device 18 may control furnace 14 to hold a substantially constant heat treatment temperature within furnace or a heat treatment temperature that varies within a prescribed range over a selected period of time.

In some examples, article 20 may be held within furnace 14 at the heat treatment temperature such that coating 14 reaches a temperature at or above the crystalline phase temperature of the one or more layers of coating 14. Article 20 may be held within furnace 14 at the heat treatment temperature such that EBC layer 28 and/or bond layer 26 reaches a temperature at or above the temperature at which the amorphous phase transitions to a crystalline phase. Article 66 may be held within furnace 14 for heat treatment for a suitable amount of time to provide for a desired amount of crystalline phase in EBC system 68.

In some examples, the relatively high rate of temperature change to the elevated heat treatment temperature may allow the amorphous phase of the as-deposited coating to flow, e.g., to fill the pores (e.g., interconnected pores), microcracks, and/or other voids of the as-deposited coating, before transitioning to crystalline phase. The filling of the pores, microcracks, and/or other voids may reduce the gas permeability of the one or more layers of coating 24. In some examples, the porosity and/or microcracks of layer 28 and/or layer 32 may be decreased by heat treatment of coating 24 (44). In some examples, the heat treatment of coating 24 may decrease the porosity and/or microcracks of EBC layer 28 by at least about 25 percent, at least about 33% (e.g., from about 6% to about 4%), or at least about 50 percent (e.g., from about 6% to about 3%), e.g., as compared to the porosity of the as-deposited EBC layer 28 and/or a similar coating that has been heat treated with a slower rate of temperature increase (e.g., 15° C./min or less). In some examples, in the case of an abradable layer, the heat treatment of coating 24 may decrease the porosity and/or microcracks of abradable layer 32 by at least 10 percent, such as about 10% to about 30%, compared to the porosity of the as-deposited abradable layer 32 and/or a similar coating that has been heat treated with a slower rate of temperature increase (e.g., 15° C./min or less).

In some examples, the reduction in porosity, microcracks, and/or other voids in one or more layers of coating 24 may also increase the density of the one or more layers although the increase in density may not be significant. In some examples, the density may increase about 33% (e.g., from about 6% in the same coating that was heat treated with a slow rate of temperature increase (e.g., 15° C./min) to about 4%) or, e.g., increase about 0.1% to about 0.6%. In other examples, the density may decrease depending upon the coating chemistry (e.g., YbMS content). The volume expansion due to phase transformation may overcome the reduction of porosity. Regardless, the gas (e.g., air) permeability of the one or more layers of coating 24 may be reduced after heat treatment. In some examples, the one or more layers of coating 24 may be substantially hermetic following the post deposition heat treatment.

Additionally, or alternatively, the heat treatment of coating 24 may be configured to control the grain size and/or amount of crystalline phase in the heat treated coating. In some examples, the rate of temperature change, elevated heat treatment temperature, and/or duration of the heat treatment may be selected to nucleate and grow a relatively small number of grains in the heat treated coating. The relatively small number of grains may be grown to a relatively large size, thus reducing the concentration of grain boundaries in the one or more layers of coating 14. Additionally, or alternatively, the heat treatment of coating 24 may be configured to control the microstructure of coating 24 (e.g., control the size and distribution of secondary phases such as ytterbium monosilicate in the coating).

In some examples, the number of nucleated grains may be dependent upon the heat treatment temperature. The heat treatment duration may also affect the final number of grains remaining. If the heat treatment is high enough in temperature to grow the grains, smaller grains will be consumed at the expense of the larger ones. The heat treatment temperature or temperature ranges may be selected achieve specific nucleation and/or growth characteristics. In some examples, a grain growth portion of the heat treatment may need to be performed at a high enough temperature that allows for sufficient solid state diffusion rates. In some examples, such a heat treatment temperature may have a lower limit of about 800 degrees Celsius.

Following the post-deposition heat treatment, article 20 may be cooled within furnace 14 or outside furnace from that of the heat treatment temperature. In some examples, controller device 18 may control the rate of cooling of furnace 14 over a particle period of time such that article 20 cools at a controlled rate over the period of time, as compared to simply removing article 20 from furnace 14 and or simply turning off furnace 14 while article 20 is inside. In other example, controller device 18 may simply turn off the heating of furnace 14 or article 20 may be removed from furnace 14 into a cooler environment.

In some examples, in order to achieve and control desired temperature(s), system 10 may be configured to monitor the temperature of coating 24, substrate 22, and/or furnace 14 using one or more suitable temperature sensors (e.g., thermocouples) located to accurately measure temperature (e.g., in substantially real-time) during the described techniques. In some examples, such components may be thermocoupled during process development trials to confirm that the desired heating/cooling rates are as expected, with the measured temperatures in that particular furnace zone used for control afterwards.

FIGS. 5A and 5B are plots showing two example post deposition heat treatments of article 20 in terms of temperature of coating 24 versus time during the heat treatment of article 20. Similar example heat treatment protocols may be carried out on other coatings, such as, coating 24 of article 30 shown in FIG. 3.

With reference to FIG. 5A, prior to the post deposition heat treatment, coating 24 may be at a relatively low temperature T(RT), e.g., room temperature or approximately 25° C. The heat treatment of coating 24 may begin at time t1 when coating 24 is heated, e.g., by placing article 20 in already heated furnace 14 and/or turning on furnace 14 while article 20 is within furnace 14 to heat up furnace 14 with article 20. Regardless, coating 14 is heated to increase the temperature of coating 14 at a relatively fast rate from temperature T(RT) to temperature T(HT) from time t1 to time t2. Although the ramp up of the temperature is shown to be approximately linear, it is understood that the rate of change may be non-linear. In some examples, the rate of temperature changes may be defined as the overall change in temperature (ΔTemp) divided by the difference in time between t1 and t2. In some examples, the rate of temperature change of coating 24 from time t1 to time t2 may be greater than 15° C./min, such as, about 100° C./min to about 300° C./min. As described herein, the rate of temperature change may cause a decrease in porosity and/or microcracks of one or more layers of coating 14, e.g., as compared to the as-deposited layers.

Once coating 24 reaches the desired heat treatment temperature T(HT), coating 24 may be held at (or above) temperature T(HT) for the time period from time t2 to time t3. In some examples, T(HT) may be about 500° C. to about 1500° C., such as, about 900° C. to about 1300° C. or about 1000° C. to about 1300° C. In some examples, the duration from time t2 to time t3 may be about 0.1 hours to about 100 hours. The duration of the heat treatment may be selected by observation of the changes in microstructure, phase equilibra via XRD, density measurements, permeability measurements, and the like. Using one or more of these techniques, a duration may be selected based on when the changes appear to stop or become more stable. In some examples, a higher heat treatment temperature may result in a shorter duration of the heat treatment.

At time t3, the heat treatment may end and article 20 may be cooled, e.g., within furnace 14 or by removing article 20 from furnace 14, back to temperature T(RT) at time t4. The rate of cooling may be controlled or may be uncontrolled following the heat treatment.

In the example heat treatment of FIG. 5B, the heat treatment is divided into more than one segment. Each segment may have a unique heat treatment temperature, duration, and/or rate of temperature increase. For example, according to FIG. 5B, the heat treatment of coating 14 post deposition may include two segments with a first segment from time t5 to time t7 and a second segment from time t7 to time t9.

Like the heat treatment of FIG. 5A, prior to the post deposition heat treatment, coating 24 may be at a relatively low temperature T(RT), e.g., room temperature or approximately 25° C. The heat treatment of coating 24 may begin at time t5 when coating 24 is heated, e.g., by placing article 20 in already heated furnace 14 and/or turning on furnace 14 while article 20 is within furnace 14 to heat up furnace 14 with article 20. Regardless, coating 14 is heated to increase the temperature of coating 14 at a relatively fast rate from temperature T(RT) to temperature T(HT1) from time t5 to time t6. The rate of change may define the rate of temperature change for the first segment of the heat treatment. Coating 24 may be held at temperature T(HT1) for a selected duration of time of the first segment from time t6 to time t7. From time t7 to time t8, coating 24 is heated again to increase the temperature of coating 14 from temperature T(HT1) to temperature T(HT2), which defines the rate of temperature change for the second segment of the heat treatment. Coating 24 may be held at temperature T(HT2) for a selected duration of time of the second segment from time t8 to time t9. At time t9, the heat treatment and second segment end, at which time coating 24 may be cooled as described above with regard to FIG. 5A until coating 24 reaches temperature T(RT) at time t10.

In some examples, the more than one segments of a heat treatment may be designed to achieve different results. For example, the first segment of the heat treatment in FIG. 5B may be configured to decrease the open porosity and/or microcrack networks of the one or more layers of coating 24, e.g., as compared to the as-deposited coating, while the second segment of the heat treatment may be configured to control the grain size of one or more layers of coating 14, or vice versa.

In some examples, although not shown in FIG. 5B, the first segment of the heat treatment may be at a higher temperature than the temperature of the second segment. Grain size, densification and/or reducing porosity/microcracks may be able to be controlled at relatively similar temperatures. In some examples, higher temperatures may enable growth and limit nucleation while at the same time allow the material to flow before crystallization. The two or more segment of the heat treatment may have substantially the same or different temperatures. In some examples, T(HT1) and T(HT2) may be between 1000 and 1400° C., and may be substantially the same or different. In some examples, the duration for each segment may be greater than about 0.5 hours and less than about 10 hours, and may the same duration or different duration for each segment. The rate of temperature changes for one or both segment may be above 15° C./min.

In some examples, for Ytterbium disilicate materials during heat treatment, the following may take place at the described temperature ranges: 1) room temperature to about 960° C., amorphous phase stress relaxation; 2) about 960° C. to about 1033° C., devitrification of amorphous phase to $Yb_2Si_2O_7+Yb_2SiO_5$ (P21/c); and 3) about 1033° C. to about 1200° C., phase transformation $Yb_2Si_2O_7+Yb_2SiO_5$ (P21/c) to $Yb_2Si_2O_7+Yb_2SiO_5$ (I2/a). The different segments of a heat treatment such as that shown in FIG. 5B may be designed to promote the flow of amorphous material before devitrification and control the rate of phase transformation and grain growth.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Examples

Various experiments and investigations were carried out to evaluate aspects of one or more examples of the disclosure. However, the disclosure is not limited by the experiments, investigation, or the corresponding description.

Figure 6:
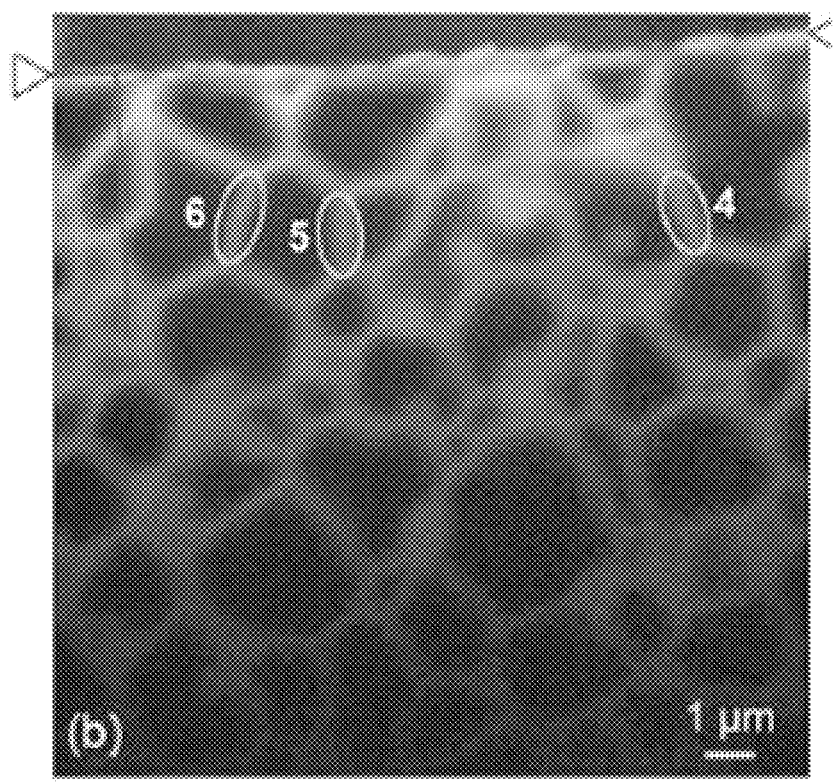
FIG. 6 is an image showing grain boundaries of an example EBC layer.

As noted above, grain boundaries may be fast transport pathways for oxidants in RE silicates. FIG. 6 is a Secondary Ion Mass Spectrometry (SIMS)$^{18}$O map showing higher concentration of oxygen along the grain boundaries of a dense $Yb_2Si_2O_7$ specimen (reproduced from M. Wada, "Mass transfer in polycrystalline ytterbium disilicate under oxygen potential gradients at high temperatures," Acta Materialia, 135, 372-381 (2017)).

Figure 8:
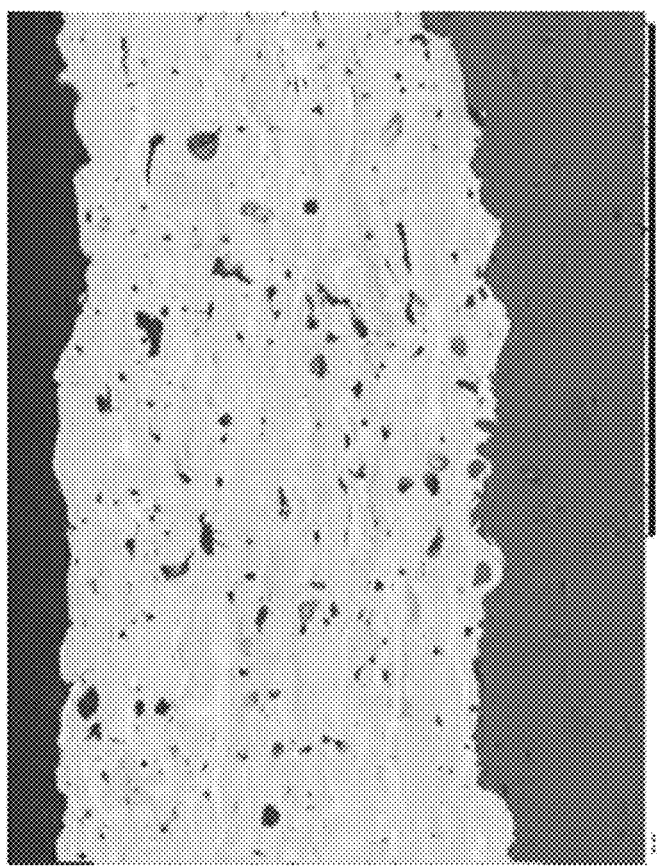
FIGS. 7 and 8 are images showing an as-deposited EBC layer and the EBC layer following heat treatment, respectively.
Figure 7:
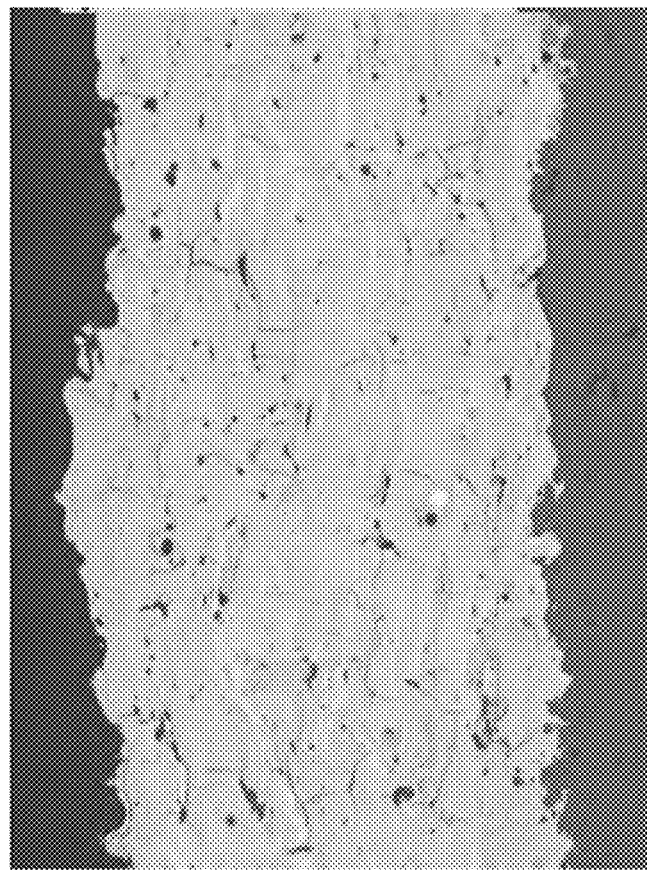

Also as noted above, in some examples, heat treatment on an EBC containing a significant volume percentage of second phase material (e.g., monosilicate) may cause the EBC to become more porous. FIG. 7 is a backscatter scanning electron microscope (SEM) image of an EBC as-deposited using a Praxair SG-100 plasma gun to air plasma spray Ytterbium disilicate powder on to a plasma sprayed silicon bond coat. The silicon bond coat was plasma sprayed onto CMC substrates (not shown in the images). FIG. 8 is an image of the same EBC following heat treatment for two hours at 1200° C. in air using an initial ramp rate (temperature increase) from room temperature to 1200° C. of 15° C./min. As shown, the porosity of the EBC increased as a result of the heat treatment compared to the as-deposited EBC.

FIGS. 9A-9C are images of six $Yb_2Si_2O_7$ EBCs sprayed with different powders, guns and spray parameters: FIG. 9A—F4 MB gun with spray dried and sintered powder; FIG. 9B—SG-100 gun with fused and crushed powder; and FIG. 9C—SG-100 gun with spray dried and sintered powder. Two coatings (top and bottom image for each of FIGS. 9A, 9B, and 9C) in the same group were sprayed at the same time with the same spray parameters to obtain a total of six samples. All six samples underwent 300 cycles of a cyclic steam test in a 90% $H_2O$ (g)—10% air environment at 1316° C. with cycles of 1 hr hot/0.5 hr cold. For each of FIGS. 9A, 9B, and 9C, the sample in the bottom image had been heat treated for 2 hrs at 1200° C. in air prior to the steam cycle test. The heating rate for the heat treatment was 15° C./min. For each of FIGS. 9A, 9B, and 9C, the sample in the top image was introduced into the steam test (furnace preheated to 1316° C.) in the as-deposited condition.

Figure 10:
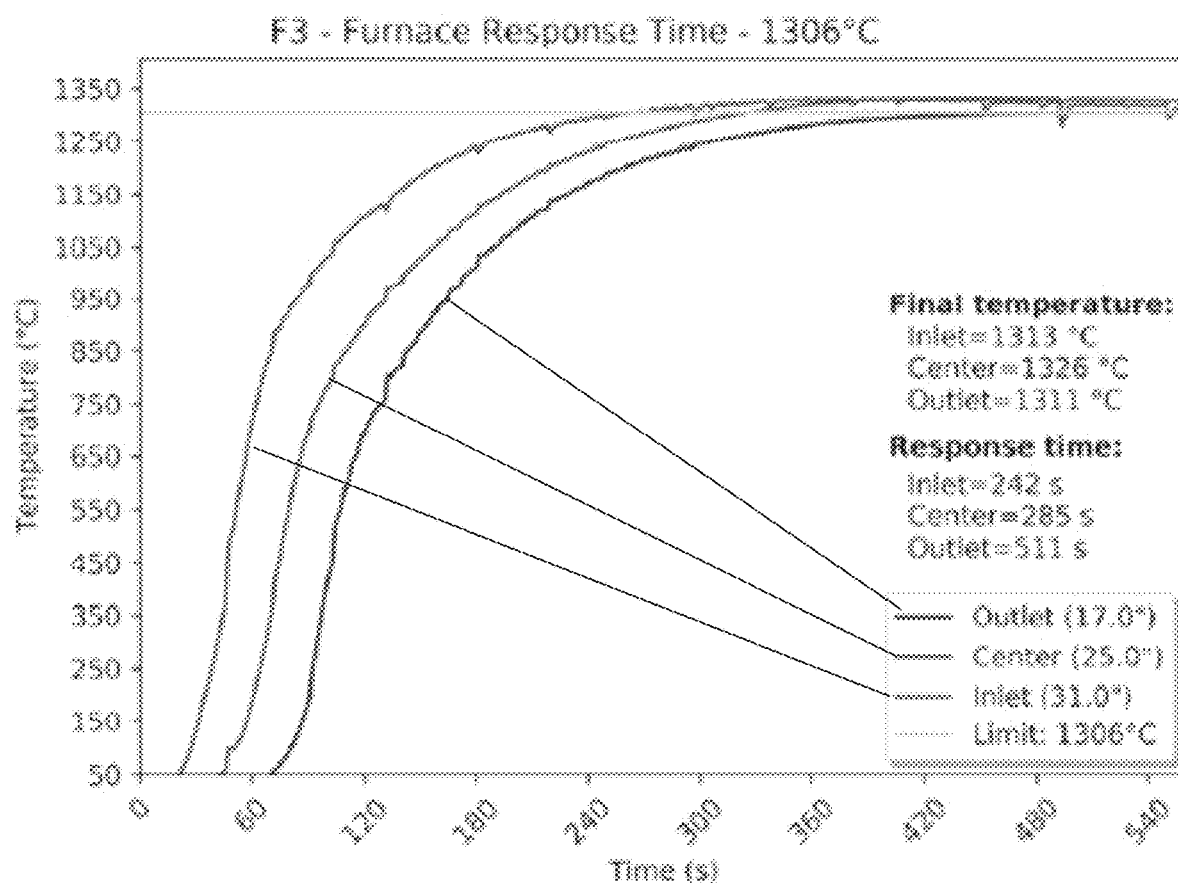
FIG. 10 is a plot of furnace temperature versus time for a heat treatment of the samples shown in FIGS. 9A-9C.

Upon insertion into the steam furnace each of the samples were rapidly heated at a heating rate profile shown in FIG. 10 (approximately 150° C./min). The top three images show a denser microstructure with reduced porosity and microcracks. In addition, a much thinner (almost half) thermally grown oxide (TGO) 92 was observed for the top set of images compared to their pre-heat treated counterparts in the bottom set of images. This displayed how the fast heating rate may change the densification behavior of the EBC. For the bottom set of coatings in FIGS. 9A-9C, the gas (air) permeability changed from about 26785 nm$^2$ to about 22582 nm$^2$ after the heat treatment while the gas (air) permeability changed of the top set of coatings changed from about 11204 nm$^2$ to about 0 nm$^2$ (hermetic under current testing condition).

Modifying the heating rate was shown to significantly affect the microstructure of the EBC. It is believed that the fast heating rate allowed the coating to remain viscoelastic for sufficient time to flow and close open porosity and heal cracks (top images of FIGS. 9A-9C). The samples that were heat treated using a slower rate of 15° C./min (bottom images of FIGS. 9A-9C) crystalized before significant viscoelastic flow could occur which effectively "locked" the coatings microstructure that contained open pores and cracks. It was also noted that the heating rate affected the morphology, size and distribution of $Yb_2O_3$-rich particles and bands (lighter grey phase) in the EBC. These $Yb_2O_3$-rich particles and bands may be desirable as they can increase the water vapor and calcium magnesium aluminosilicate (CMAS) resistance of the EBC.

Various examples have been described. These and other examples are within the scope of the following clauses and claims.

Clause Set I:

Clause 1. A method comprising: depositing a coating on a ceramic or ceramic matrix composite (CMC) substrate to form an as-deposited coating, wherein the coating includes at least one of an environmental barrier coating (EBC) and an abradable coating; and heat treating the as-deposited coating at or above a first temperature for a first period of time following the deposition of the as-deposited coating on the substrate, wherein heat treating the as-deposited coating includes heating the as-deposited coating to or above the first temperature at a controlled rate, wherein the controlled rate is selected to decrease at least one of an open porosity or microcracks of the heat-treated coating compared to the as-deposited coating.

Clause 2. The method of clause 1, wherein decreasing the at least one of the open porosity or the microcracks of the heat-treated coating compared to the as-deposited coating comprises decreasing a percentage of interconnected pores and crack networks of the heat-treated coating compared to the as-deposited coating.

Clause 3. The method of clause 1, wherein decreasing the at least one of the open porosity or the microcracks of the heat-treated coating compared to the as-deposited coating comprises closing at least a portion of the interconnected pores and microcrack networks of the as-deposited coating.

Clause 4. The method of clause 1, wherein the controlled rate is greater than or equal to 15 degrees Celsius per minute (° C./min).

Clause 5. The method of clause 1, wherein the controlled rate is about 100° C./min to about 300° C./min.

Clause 6. The method of clause 1, wherein the first temperature is about 500 degrees Celsius (° C.) to about 1500° C.

Clause 7. The method of clause 1, wherein at least one of the controlled rate, the first temperature, or the first period of time is selected to control grain size of the heat-treated coating.

Clause 8. The method of clause 7, wherein the grain size is controlled to increase grain size and decrease grain boundaries of the heat-treated coating.

Clause 9. The method of clause 1, wherein at least one of the controlled rate, the first temperature, or the first period of time is selected to control a size and distribution of secondary phases in the heat-treated coating.

Clause 10. The method of clause 1, wherein the heat treatment includes a first segment during which the as-deposited coating is at the first temperature for the first period of time and a second segment during which the as-deposited coating is at a second temperature for a second period of time, wherein the first segment is configured to decrease the at least one of the open porosity or the microcracks of the heat-treated coating and the second segment is configured to control a grain size of the heat-treated coating compared to the as-deposited coating.

Clause 11. The method of clause 1, wherein depositing the coating on the substrate to form the as-deposited coating comprises depositing the coating on the substrate via at least one of thermal spray deposition or slurry deposition.

Clause 12. The method of clause 1, wherein the controlled rate is selected to increase a density of the heat-treated coating compared to the as-deposited coating.

Clause 13. The method of any one of clauses 1-12, wherein the coating includes at least one of rare earth (RE) monosilicate or RE disilicate.

Clause 14. The method of any one of clauses 1-13, wherein the heat-treated coating includes the EBC on the substrate and the abradable layer on the EBC.

Clause 15. The method of any one of clauses 1-14, wherein the coating includes a bond layer, the bond layer comprising at least one of silicon.

Clause 16. The method of any one of clauses 1-15, wherein the decrease in the at least one of the open porosity or the microcracks of the heat-treated coating causes a decreases a gas permeability of the heat-treated coating compared to the as-deposited coating.

Clause 17. The method of any one of clauses 1-16, wherein the heat treated coating is approximately hermetic.

Clause 18. A system comprising: a deposition device configured to deposit a coating on a ceramic or ceramic matrix composite (CMC) substrate to form an as-deposited coating, wherein the coating includes at least one of an environmental barrier coating (EBC) and an abradable coating; a furnace configured to heat the as-deposited coating following deposition of the as-deposited coating by the deposition device; and a controller device configured to control the heat treatment of the as-deposited coating at or above a first temperature for a first period of time following the deposition of the as-deposited coating on the substrate, wherein the controller device controls a rate at which the furnace increases a temperature of the as-deposited coating during the heat treatment to or above the first temperature, wherein the controlled rate is selected to decrease at least one of an open porosity or microcracks of the heat-treated coating compared to the as-deposited coating.

Clause 19. The system of clause 18, wherein the controlled rate is selected to decrease a percentage of interconnected pores and crack networks of the heat-treated coating compared to the as-deposited coating.

Clause 20. The system of clause 18, wherein the controlled rate is selected to close at least a portion of the interconnected pores and microcrack networks of the as-deposited coating.

Clause 21. The system of clause 18, wherein the controlled rate is greater than or equal to 15 degrees Celsius per minute (° C./min).

Clause 22. The system of clause 18, wherein the controlled rate is about 100° C./min to about 300° C./min.

Clause 23. The system of clause 18, wherein the first temperature is about 500 degrees Celsius (° C.) to about 1500° C.

Clause 24. The system of clause 18, wherein at least one of the controlled rate, the first temperature, or the first period of time is selected to control grain size of the heat-treated coating.

Clause 25. The system of clause 24, wherein the grain size is controlled to increase grain size and decrease grain boundaries of the heat-treated coating.

Clause 26. The system of clause 18, wherein at least one of the controlled rate, the first temperature, or the first period of time is selected to control a size and distribution of secondary phases in the heat-treated coating.

Clause 27. The system of clause 18, wherein the heat treatment includes a first segment during which the as-deposited coating is at the first temperature for the first period of time and a second segment during which the as-deposited coating is at a second temperature for a second period of time, wherein the first segment is configured to decrease the at least one of the open porosity or the microcracks of the heat-treated coating and the second segment is configured to control a grain size of the heat-treated coating compared to the as-deposited coating.

Clause 28. The system of clause 18, wherein the deposition device is configured to deposit the coating on the substrate via at least one of thermal spray deposition or slurry deposition.

Clause 29. The system of clause 18, wherein the controlled rate is selected to increase a density of the heat-treated coating compared to the as-deposited coating.

Clause 30. The system of any one of clauses 18-29, wherein the coating includes at least one of rare earth (RE) monosilicate or RE disilicate.

Clause 31. The system of any one of clauses 18-30, wherein the heat-treated coating includes the EBC on the substrate and the abradable layer on the EBC.

Clause 32. The system of any one of clauses 18-31, wherein the coating includes a bond layer, the bond layer comprising at least one of silicon.

Clause 33. The system of any one of clauses 18-32, wherein the decrease in the at least one of the open porosity or the microcracks of the heat-treated coating causes a decreases a gas permeability of the heat-treated coating compared to the as-deposited coating.

Clause 34. The system of any one of clauses 18-33, wherein the heat treated coating is approximately hermetic.

Clause Set II:

Clause 1. A method comprising: depositing a coating on a ceramic or ceramic matrix composite (CMC) substrate to form an as-deposited coating, wherein the coating includes at least one of an environmental barrier coating (EBC) and an abradable coating; and heat treating the as-deposited coating at or above a first temperature for a first period of time following the deposition of the as-deposited coating on the substrate, wherein heat treating the as-deposited coating includes heating the as-deposited coating to or above the first temperature at a controlled rate, wherein at least one of the controlled rate, first temperature, or first time period is selected to control a grain size of the heat-treated EBC.

Clause 2. The method of clause 1, wherein the grain size is controlled to increase grain size and decrease grain boundaries of the heat-treated coating.

Clause 3. The method of clause 1, wherein the controlled rate is greater than or equal to 15 degrees Celsius per minute (° C./min).

Clause 4. The method of clause 1, wherein the controlled rate is about 100° C./min to about 300° C./min.

Clause 5. The method of clause 1, wherein the first temperature is about 500 degrees Celsius (° C.) to about 1500° C.

Clause 6. The method of clause 1, wherein the controlled rate is selected to decrease at least one of an open porosity or microcracks of the heat treated coating compared to the as-deposited coating.

Clause 7. The method of clause 6, wherein the controlled rate is greater than or equal to 15 degrees Celsius per minute (° C./min).

Clause 8. The method of clause 6, wherein the controlled rate is about 100° C./min to about 300° C./min.

Clause 9. The method of clause 1, wherein at least one of the controlled rate, the first temperature, or the first period of time is selected to control a size and distribution of secondary phases in the heat-treated coating.

Clause 10. The method of clause 1, wherein the heat treatment includes a first segment during which the as-deposited coating is at a second temperature for a second period of time and a second segment during which the as-deposited coating is at the first temperature for the first period of time, wherein the first segment is configured to decrease at least one of an open porosity or microcracks of the heat-treated coating compared to the as-deposited coating and the second segment is configured to control the grain size of the heat-treated coating compared to the as-deposited coating.

Clause 11. The method of clause 1, wherein depositing the coating on the substrate to form the as-deposited coating comprises depositing the coating on the substrate via at least one of thermal spray deposition or slurry deposition.

Clause 12. The method of any one of clauses 1-11, wherein the coating includes at least one of rare earth (RE) monosilicate or RE disilicate.

Clause 13. The method of any one of clauses 1-12, wherein the heat-treated coating includes the EBC on the substrate and the abradable layer on the EBC.

Clause 14. The method of any one of clauses 1-13, wherein the coating includes a bond layer, the bond layer comprising at least one of silicon.

Clause 15. The method of any one of clauses 1-14, wherein the controlled rate is selected to decrease at least one of an open porosity or microcracks of the heat treated coating compared to the as-deposited coating, and wherein the decrease in the at least one of the open porosity or the microcracks of the heat-treated coating causes a decreases a gas permeability of the heat-treated coating compared to the as-deposited coating.

Clause 16. The method of any one of clauses 1-16, wherein the controlled rate is selected to decrease at least one of an open porosity or microcracks of the heat treated coating compared to the as-deposited coating, and wherein the heat treated coating is approximately hermetic.

Clause 17. A system comprising: a deposition device configured to deposit a coating on a ceramic or ceramic matrix composite (CMC) substrate to form an as-deposited coating, wherein the coating includes at least one of an environmental barrier coating (EBC) and an abradable coating; a furnace configured to heat the as-deposited coating following deposition of the as-deposited coating by the deposition device; and a controller device configured to control the heat treatment of the as-deposited coating at or above a first temperature for a first period of time following the deposition of the as-deposited coating on the substrate, wherein the controller device controls a rate at which the furnace increases a temperature of the as-deposited coating during the heat treatment to or above the first temperature, wherein at least one of the controlled rate, first temperature, or first time period is selected to control a grain size of the heat-treated EBC.

Clause 18. The system of clause 17, wherein the grain size is controlled to increase grain size and decrease grain boundaries of the heat-treated coating.

Clause 19. The system of clause 17, wherein the controlled rate is greater than 15 degrees Celsius per minute (° C./min).

Clause 20. The system of clause 17, wherein the controlled rate is about 100° C./min to about 300° C./min.

Clause 21. The system of clause 17, wherein the first temperature is about 500 degrees Celsius (° C.) to about 1500° C.

Clause 22. The system of clause 17, wherein the controlled rate is selected to decrease at least one of an open porosity or microcracks of the heat treated coating compared to the as-deposited coating.

Clause 23. The system of clause 22, wherein the controlled rate is greater than or equal to 15 degrees Celsius per minute (° C./min).

Clause 24. The system of clause 22, wherein the controlled rate is about 100° C./min to about 300° C./min.

Clause 25. The system of clause 17, wherein at least one of the controlled rate, the first temperature, or the first period of time is selected to control a size and distribution of secondary phases in the heat-treated coating.

Clause 26. The system of clause 17, wherein the heat treatment includes a first segment during which the as-deposited coating is at a second temperature for a second period of time and a second segment during which the as-deposited coating is at the first temperature for the first period of time, wherein the first segment is configured to decrease at least one of an open porosity or microcracks of the heat-treated coating compared to the as-deposited coating and the second segment is configured to control the grain size of the heat-treated coating compared to the as-deposited coating.

Clause 27. The system of clause 17, wherein the deposition device is configured to deposit the coating on the substrate via at least one of thermal spray deposition or slurry deposition.

Clause 28. The system of any one of clauses 17-27, wherein the coating includes at least one of rare earth (RE) monosilicate or RE disilicate.

Clause 29. The system of any one of clauses 17-28, wherein the heat-treated coating includes the EBC on the substrate and the abradable layer on the EBC.

Clause 30. The system of any one of clauses 17-29, wherein the coating includes a bond layer, the bond layer comprising at least one of silicon.

Clause 31. The system of any one of clauses 17-30, wherein the controlled rate is selected to decrease at least one of an open porosity or microcracks of the heat treated coating compared to the as-deposited coating, and wherein the decrease in the at least one of the open porosity or the microcracks of the heat-treated coating causes a decreases a gas permeability of the heat-treated coating compared to the as-deposited coating.

Clause 32. The system of any one of clauses 17-31, wherein the controlled rate is selected to decrease at least one of an open porosity or microcracks of the heat treated coating compared to the as-deposited coating, and wherein the heat treated coating is approximately hermetic.

What is claimed is:

1. A method comprising:
depositing, via a thermal spray process, a coating on a ceramic or ceramic matrix composite (CMC) substrate to form an as-deposited coating, wherein the as-deposited coating includes at least 70 volume percent of amorphous phase, wherein the coating includes at least one of an environmental barrier coating (EBC) and an abradable coating; and
heat treating the as-deposited coating at or above a first temperature for a first period of time following the deposition of the as-deposited coating on the substrate to transition at least a portion of the amorphous phase in the as-deposited coating to crystalline phase, wherein heat treating the as-deposited coating includes heating the as-deposited coating to or above the first temperature at a controlled rate, wherein the controlled rate is selected to allow the amorphous phase of the as-deposited coating to flow before transitioning to crystalline phase such that at least one of an open porosity or microcracks of the heat-treated coating decreases compared to the as-deposited coating, and wherein the controlled rate is between 100° C./min and 300° C./min,
wherein the heat treatment includes a first segment during which the as-deposited coating is at the first temperature for the first period of time and a second segment during which the as-deposited coating is at a second temperature for a second period of time,
wherein the first segment is configured to decrease the at least one of the open porosity or the microcracks of the heat-treated coating with the flow of the amorphous phase of the as-deposited coating before transitioning to the crystalline phase and the second segment is configured to control a grain size of the heat-treated coating compared to the as-deposited coating,
wherein the first temperature is different than the second temperature, and
wherein the heat treatment includes controlling the rate of temperature change between the first segment at the first temperature and the second segment at the second temperature.

2. The method of claim 1, wherein decreasing the at least one of the open porosity or the microcracks of the heat-treated coating compared to the as-deposited coating with the flow of the amorphous phase of the as-deposited coating before transitioning to the crystalline phase comprises decreasing a percentage of interconnected pores and crack networks of the heat-treated coating compared to the as-deposited coating with the flow of the amorphous phase of the as-deposited coating before transitioning to the crystalline phase.

3. The method of claim 1, wherein decreasing the at least one of the open porosity or the microcracks of the heat-treated coating compared to the as-deposited coating with the flow of the amorphous phase of the as-deposited coating before transitioning to the crystalline phase comprises closing at least a portion of interconnected pores and microcrack networks of the as-deposited coating with the flow of the amorphous phase of the as-deposited coating before transitioning to the crystalline phase.

4. The method of claim 1, wherein the first temperature is about 500 degrees Celsius (° C.) to about 1500° C.

5. The method of claim 1, wherein at least one of the controlled rate, the first temperature, or the first period of time is selected to control grain size of the heat-treated coating.

6. The method of claim 5, wherein the grain size is controlled to increase grain size and decrease grain boundaries of the heat-treated coating.

7. The method of claim 1, wherein at least one of the controlled rate, the first temperature, or the first period of time is selected to control a size and distribution of secondary phases in the heat-treated coating.

8. The method of claim 1, wherein the controlled rate is selected to increase a density of the heat-treated coating compared to the as-deposited coating.

9. The method of claim 1, wherein the heat-treated coating includes at least one of rare earth (RE) monosilicate or RE disilicate.

10. The method of claim 1, wherein the heat-treated coating includes the EBC on the substrate and the abradable coating on the EBC.

11. The method of claim 10, wherein heat treating the as-deposited coating is configured to:
decrease a porosity of the EBC by at least about 25 percent compared to the as-deposited coating; and
decrease a porosity of the abradable coating by at least about 10 percent compared to the as-deposited coating.

12. The method of claim 1, wherein the coating includes a bond layer, the bond layer comprising at least one of silicon.

13. The method of claim 1, wherein the decrease in the at least one of the open porosity or the microcracks of the heat-treated coating decreases a gas permeability of the heat-treated coating compared to the as-deposited coating.

14. The method of claim 1, wherein the heat-treated coating is approximately hermetic.

15. The method of claim 1, wherein heat treating the as-deposited coating is configured to decrease a porosity of the heat-treated coating by at least about 25 percent compared to the as-deposited coating.

16. The method of claim 1, wherein the first segment occurs before the second segment, and wherein the first temperature is greater than the second temperature.

17. The method of claim 1, wherein heat treating the as-deposited coating is configured to control a size and distribution of a secondary phase in the heat-treated coating.

18. The method of claim 17, wherein the secondary phase includes a rare earth monosilicate.

19. The method of claim 1, wherein an average of the rate of temperature change between the first segment and the second segment is greater than about 15° C./min.

* * * * *